H. Bundel,

Seed Sower.

No. 3,769. Reissued Dec. 21. 1869.

Witnesses.

Wm. B. Wiley

Jacob Stauffer

Inventor

Henry Bundel

N. PETERS, PHOTO-LITHOGRAPHER, WASHINGTON, D. C.

UNITED STATES PATENT OFFICE.

HENRY BUNDEL, OF DAYTON, OHIO.

IMPROVEMENT IN SEEDING-MACHINES.

Specification forming part of Letters Patent No. 52,135, dated January 23, 1866; Reissue No. 3,769, dated December 21, 1869.

*To all whom it may concern:*

Be it known that I, HENRY BUNDEL, of Dayton, in the county of Montgomery and State of Ohio, have invented certain new and useful improvements in a machine or drill for sowing wheat, rye, oats, barley, and other grains or seeds; and I do hereby declare that the following is a specification thereof.

The first part of my invention consists in the use of a zigzag channeled feeder in connection with an agitating-wheel, and arranged to operate in a divided cup and in the seed-hopper, so as to take up, carry around, and drop the seed or grain without allowing it to clog or bridge over the chamber. The second part consists in the combination of said zigzag seed-delivering cylinder with a sectional case and shield.

Figure 1:
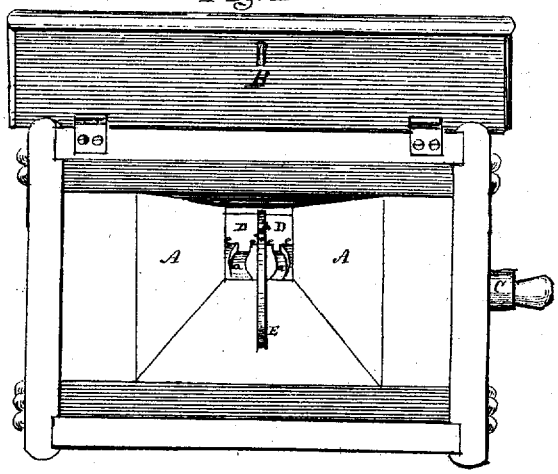
Figure 2:
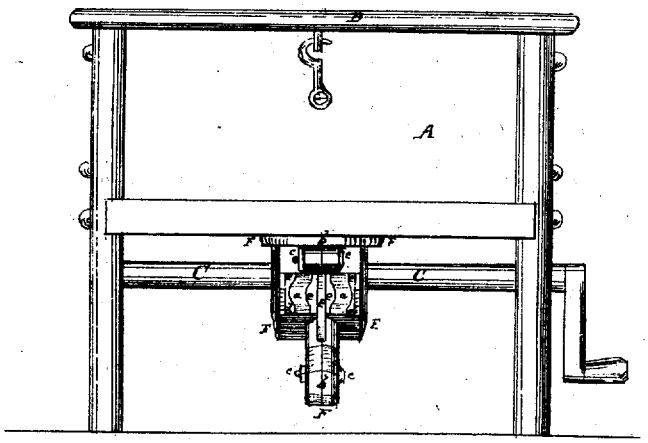

Figure 1 represents a top view of a portion of the hopper or seed-box with the seeding apparatus in place. Fig. 2 represents a front elevation of the same.

I have shown but one of the zigzag channels, agitating-wheels, and sectional cups, yet a series of the same may be used on the same, or on different shafts, and the seeding device be mounted upon wheels and otherwise furnished with all the appliances used on seed sowing or dropping machines in general.

A represents a hopper or seed-box, furnished with a lid, B, in any of the usual well-known ways. Underneath the hopper or seed-box there is a shaft, C, which may be turned by the carrying or driving wheels by any suitable gearing. Under each opening D in the bottom of the seed-box there are formed upon the shaft C zigzag channels *a a*, extending entirely around said shaft, and between each set of channels and upon the shaft is placed an agitating-wheel, E, which prevents the grain from clogging over or near the channels, and more particularly prevents it from "bridging," which is the cause of uncertain or irregular sowing. The agitating-wheel E projects some distance up into the hopper, and a corresponding, or nearly the same, distance below it, and below the hopper, it is encased in a cup or shield, F, which is cast in two sections, uniting at the line *b*, and the two sections, when properly placed, are held together by screw-bolts *c*, which admit of their being readily put on around the shaft and agitator. The cup or shield F is secured to the bottom of the hopper, and is furnished with an exit-opening, *d*, through which the grain or seed may fall to the ground or into seed-ducts, and be conducted to the ground in the ordinary well-known way. That portion of the wheel E below the shaft or enlargements upon which the zigzag channels *a a* are made is closely incased by the shield, so that no seed or other material can enter between the wheel and case to choke the wheel. The enlargements *e* on the shaft may be made separate from the shaft and slipped onto it, (keyed onto it in any suitable manner,) and the zigzag channels are formed in the peripheries of these wheel-like projections or enlarged portions.

I am not aware that such zigzag channels or chambers were ever used prior to my invention of the same on drills, or for seeding purposes, substantially in the manner set forth, with or without the intervention of an agitating-wheel.

What I claim, therefore, as my invention, and desire to secure by Letters Patent, is—

1. Combining with the shaft of seed-drills the sets of zigzag channels *a a* in the seed-delivery cylinder, with or without the interposed agitating-wheels E, when said channels are made substantially in the manner and for the purpose specified.

2. In combination with the zigzag channels and agitating wheel or wheels E, the sectional case and shield F, arranged substantially in the manner and for the purpose set forth.

HENRY BUNDEL.

Witnesses:

WM. B. WILEY,
JACOB STAUFFER.